United States Patent

Tsai

[11] Patent Number: 5,687,786
[45] Date of Patent: Nov. 18, 1997

[54] CAR SUNSHADE

[76] Inventor: Teung-Lin Tsai, No. 54-17, Huan Ya, Huan Ya Li, Yen Shui Chen, Tainan Hsien, Taiwan

[21] Appl. No.: 691,682

[22] Filed: Aug. 2, 1996

[51] Int. Cl.⁶ ..................................................... B60J 3/00
[52] U.S. Cl. .............................. 160/370.21; 160/DIG. 2
[58] Field of Search ........................ 160/370.21, 387, 160/127, 128, 237, 377, DIG. 2, DIG. 3; 296/95.1, 97.7, 97.8

[56] References Cited

U.S. PATENT DOCUMENTS

| | | | |
|---|---|---|---|
| 4,815,784 | 3/1989 | Zheng | 160/DIG. 2 X |
| 5,024,262 | 6/1991 | Huang | 160/370.21 X |
| 5,035,460 | 7/1991 | Huang | 160/370.21 X |
| 5,116,273 | 5/1992 | Chan | 160/370.21 |
| 5,213,147 | 5/1993 | Zheng | 160/370.21 |
| 5,356,191 | 10/1994 | Sheehan | 160/370.21 X |
| 5,378,518 | 1/1995 | Wang | 160/DIG. 2 X |
| 5,553,908 | 9/1996 | Shink | 160/370.21 X |
| 5,575,324 | 11/1996 | Hwang | 160/370.21 |

Primary Examiner—David M. Purol
Attorney, Agent, or Firm—Morton J. Rosenberg; David I. Klein

[57] ABSTRACT

A car sunshade having a flexible resilient border portion formed to become a loop and a sunshade cloth attached to the border portion. The border portion is shaped to have a curved portion and four corners. The border portion can be collapsed into three sections that substantially overlaps one another wherein the corners are each detained under a corresponding portion of the border portion and so the collapsed border portion won't stretch back to its original position even if the sunshade is dropped to the ground.

1 Claim, 2 Drawing Sheets

CAR SUNSHADE

BACKGROUND OF THE INVENTION

1. Field of the Invention

The present invention relates to a car sunshade of the kind having a flexible resilient border portion and a sunshade cloth portion attached to the border portion which may be collapsed by folding the border portion when the sunshade is not in use.

2. Prior Art

Referring to FIG. 2, there is shown a prior art foldable sunshade 10 having a border portion 20 made of a flexible resilient material and a cloth portion 30. The sunshade 10 is typically secured to a window glass portion of a car by means of a suction device 40 anchored to the cloth portion 30. The sunshade 10 is then positioned to shade the inside of the car from sunlight.

The border portion 20 has four curved corners 201, 202, 203, 204. In collapsing the sunshade 10, the user holds the curved corners 201, 202 with both hands and then places the sunshade 10 on any supporting base and pushes the curved corner 201 toward the curved corner 203, at the same time pushing the curved corner 202 toward the curved corner 204. Thereafter, the curved corner 201 is turned toward the curved corner 204, and the curved corner 202 is turned toward the curved corner 203 such that the sunshade 10 is collapsed into three sections that overlap. The sections prevent one another from separating to maintain the sunshade 10 in its collapsed configuration.

The sunshade 10 is thus collapsed to occupy less area in storage; however, it is found to have a disadvantage in that the flexible resilient border portion 20 of the collapsed sunshade will stretch back to its original position abruptly when the collapsed sunshade 10 is hit or dropped to the ground and is therefore likely to cause harm to bystanders.

SUMMARY OF THE INVENTION

A sunshade comprises a border portion and a sunshade cloth attached to the border portion. The border portion is made of a flexible resilient material and is formed to be a loop end shaped to have a curved portion, a first corner, a second corner, a first elongated part, a third corner, a fourth corner, a second elongated part, and a third elongated part. The first corner is provided on one end of the curved portion, while the fourth corner is provided on the other end of the curved portion. The second elongated part is provided between the first and second corners, while the third elongated part is provided between the fourth and third corners. The first elongated part is provided between the second and third corners.

The sunshade may be collapsed into several substantially overlaying sections, wherein the corners are each restrained by a corresponding portion of the border portion. Thus, the sunshade is maintained in its collapsed configuration.

The sunshade is formed such that the border portion will not abruptly stretch back to its open configuration, even if the collapsed sunshade should be hit or dropped to the ground. The risk of injury to bystanders thereby is eliminated.

BRIEF DESCRIPTION OF THE DRAWINGS

The invention will be better understood by reference to the accompanying Drawings, wherein.

DESCRIPTION OF THE PREFERRED EMBODIMENTS

Figure 1:
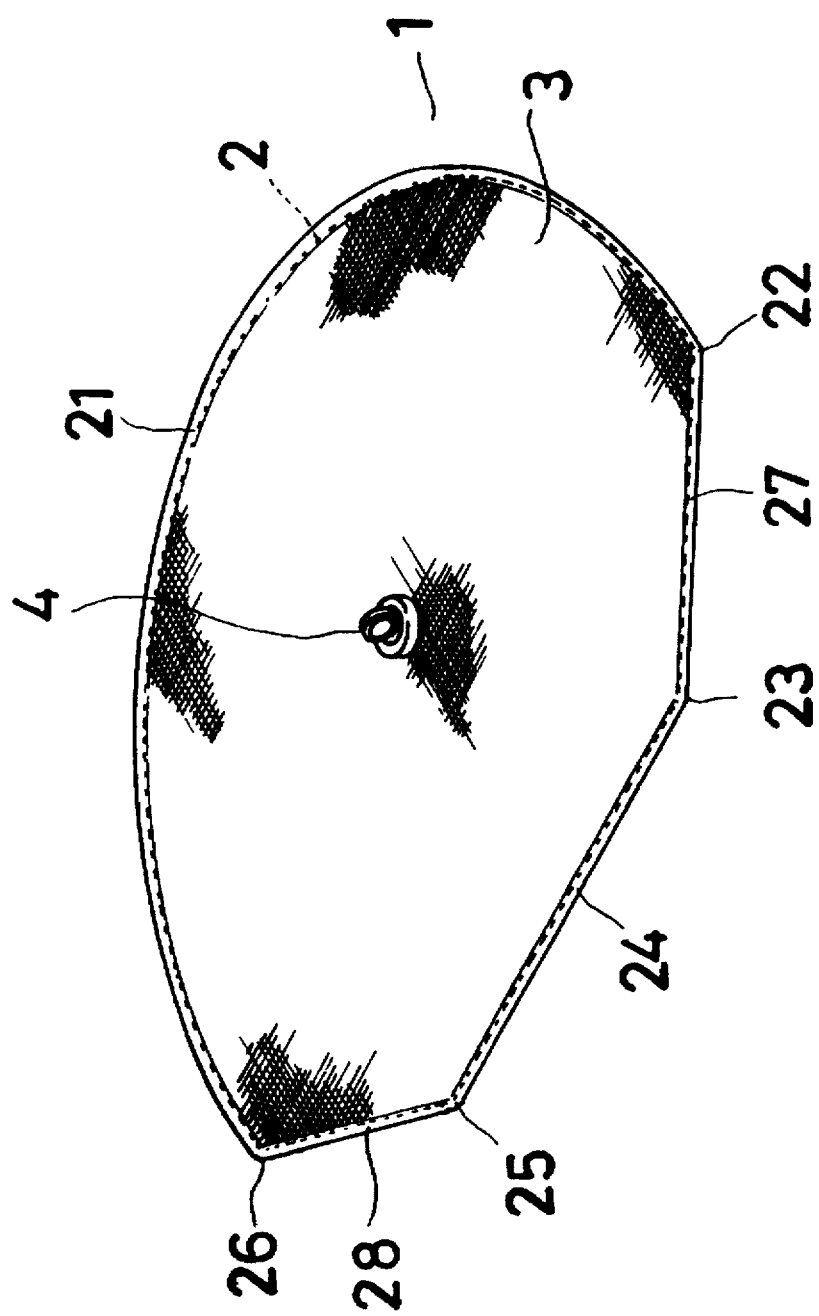
FIG. 1 is a perspective view of an embodiment of the car sunshade according to the present invention; and, FIG. 2 is a perspective view of a prior art car sunshade.
Figure 2:
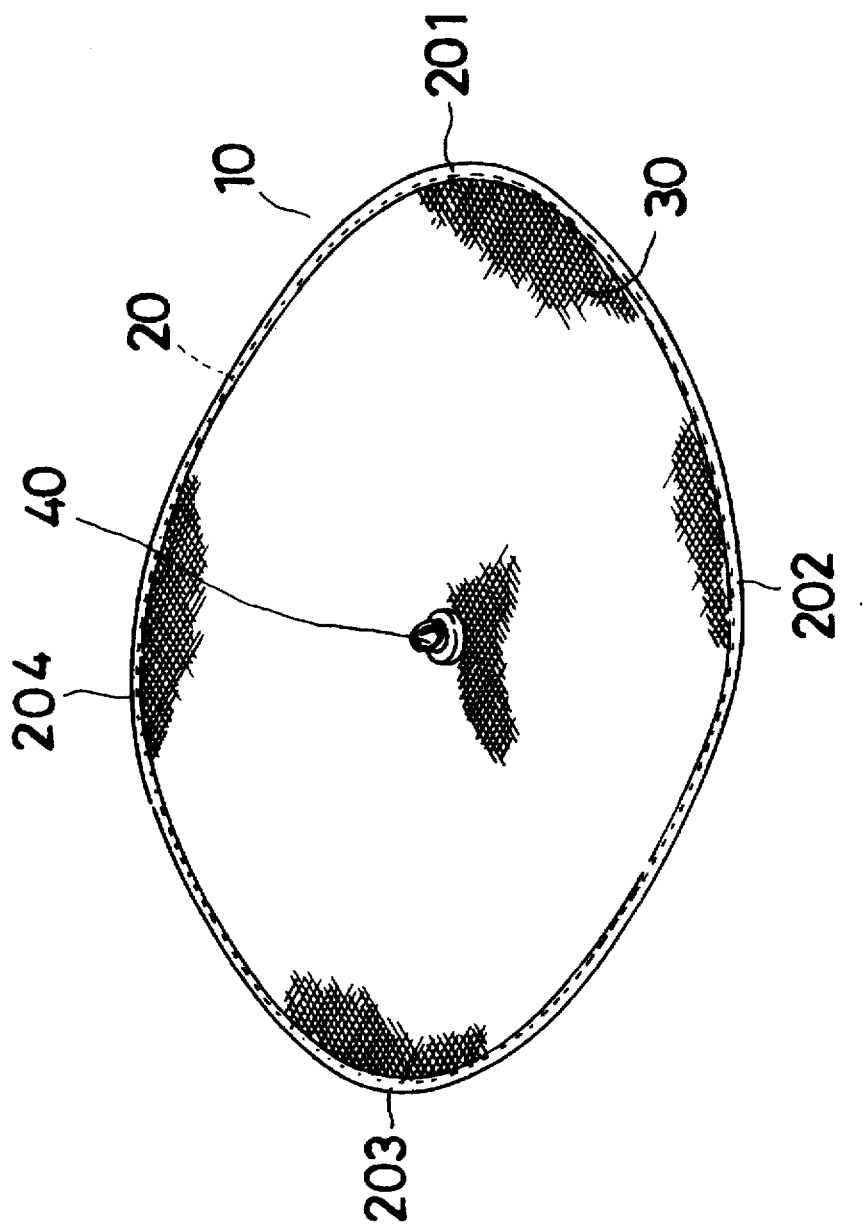

The present invention relates to a car sunshade. Referring to FIG. 1, a sunshade 1 comprises a border portion 2 and a sunshade cloth 3 attached to the border portion 2. The border portion 2 is made of a flexible resilient material and is formed to be a loop and shaped to have a curved portion 21, a first corner 22, a second corner 23, a first elongated part 24, a third corner 25, a fourth corner 26, a second elongated part 27, and a third elongated part 28. The first corner 22 is provided on one end of the curved portion 21, while the fourth corner 26 is provided on the other end of the curved portion 21. The second elongated part 27 is provided between the first and second corners 22, 23, while the third elongated part 28 is provided between the fourth and third corners 26, 25. The first elongated part 24 is provided between the second and third corners 23, 25.

A suction device 4 is anchored to the cloth 3. The first and fourth corners 22, 26 are preferably formed to have an angle of approximately 120° each, while the second and third corners 23, 25 are preferably formed to have an angle of approximately 135° each. The sunshade 1 is used on a car window glass to block the sun and may be collapsed by bending the flexible resilient border portion 2.

In collapsing the sunshade 1, the user holds the first and fourth corners 22, 26 with his right and left hands, respectively. Next, he pushes the corners 22 and 26 toward the curved portion 21. The corner 22 is then turned and pushed toward the lefthand side and, at the same time, the corner 26 is turned and pushed toward the righthand side such that the sunshade 1 is collapsed into three sections that substantially overlap, wherein the corners 22, 23, 25, and 26 are each restrained by a corresponding portion of the border portion 2. Thus, the sunshade 1 is maintained in its collapsed configuration.

The sunshade 1 having the above-described border portion 2 is found to have an advantage in that the border portion 2 will not abruptly stretch back to its open configuration should the collapsed sunshade 1 be hit or dropped to the ground. Hence, the risk of injury to bystanders thereby is eliminated.

While the preferred embodiments of the invention have been described above, it will be recognized and understood that various modifications may be made therein and that the appended claims are intended to cover all such modifications which may fall within the spirit and scope of the invention.

I claim:

1. A car sunshade comprising a flexible resilient border portion formed to become a loop and a sunshade cloth attached to said border portion, wherein said border portion is shaped to have substantially a semi-circular curved portion, a first corner on a first end of said semi-circular curved portion, a second corner, a second linear elongated part between said first and second corners, a fourth corner on a second end of said semi-circular curved portion, a third corner, a third linear elongated part between said fourth and third corners, and a first linear elongated part between said second and third corners, wherein the first and fourth corners are each shaped to have an angle approximating 120°, while the second and third corners are each shaped to have an angle approximating 135°.

* * * * *